Sept. 6, 1932. P. J. FARLEY 1,876,215
SPOOL WITH REENFORCED HEAD
Filed Aug. 23, 1929 2 Sheets-Sheet 2
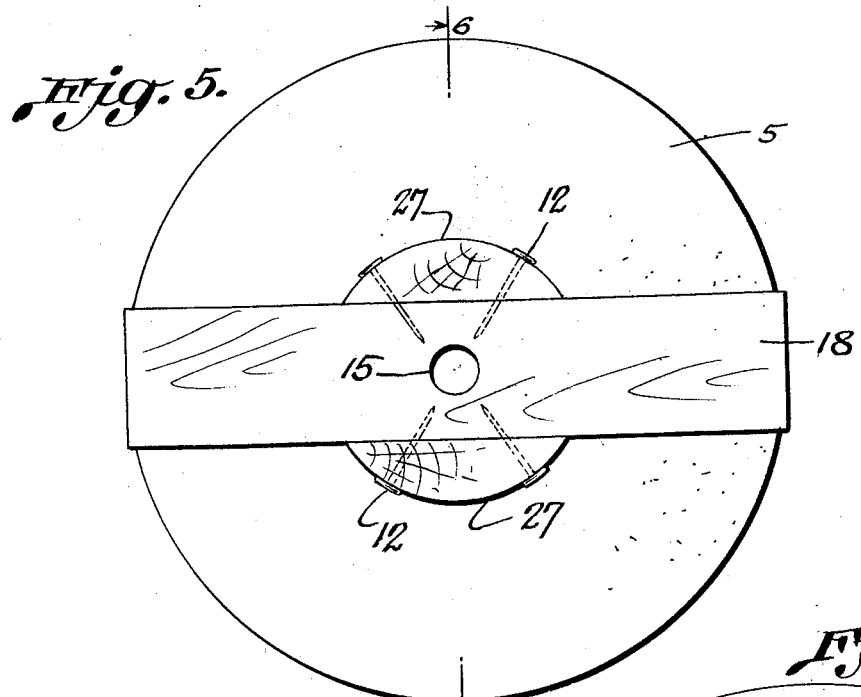
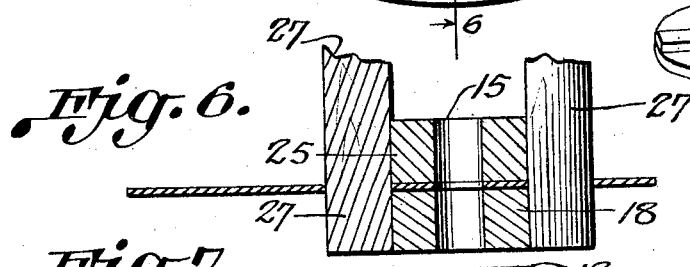
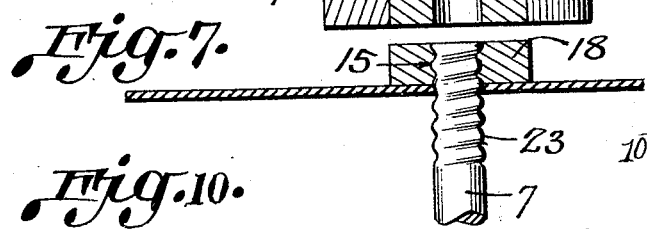
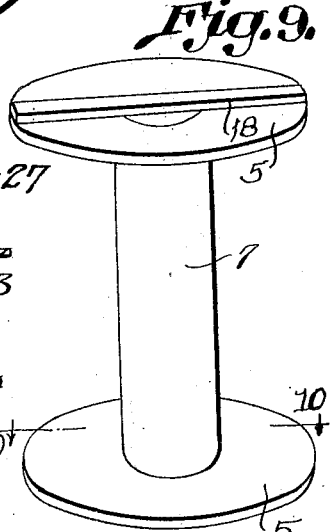
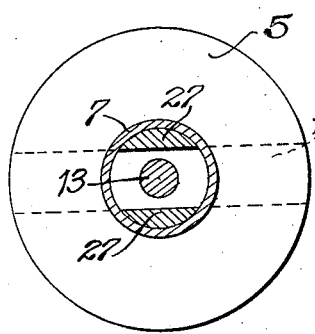
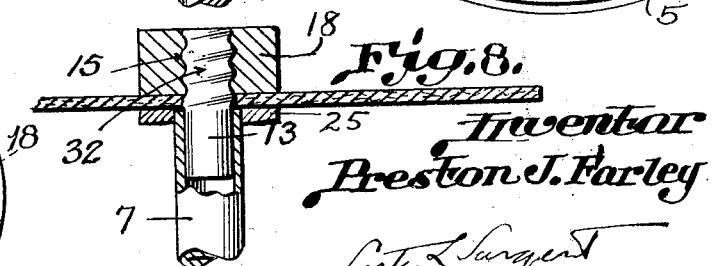
Inventor
Preston J. Farley
by Lester L. Sargent
Atty.

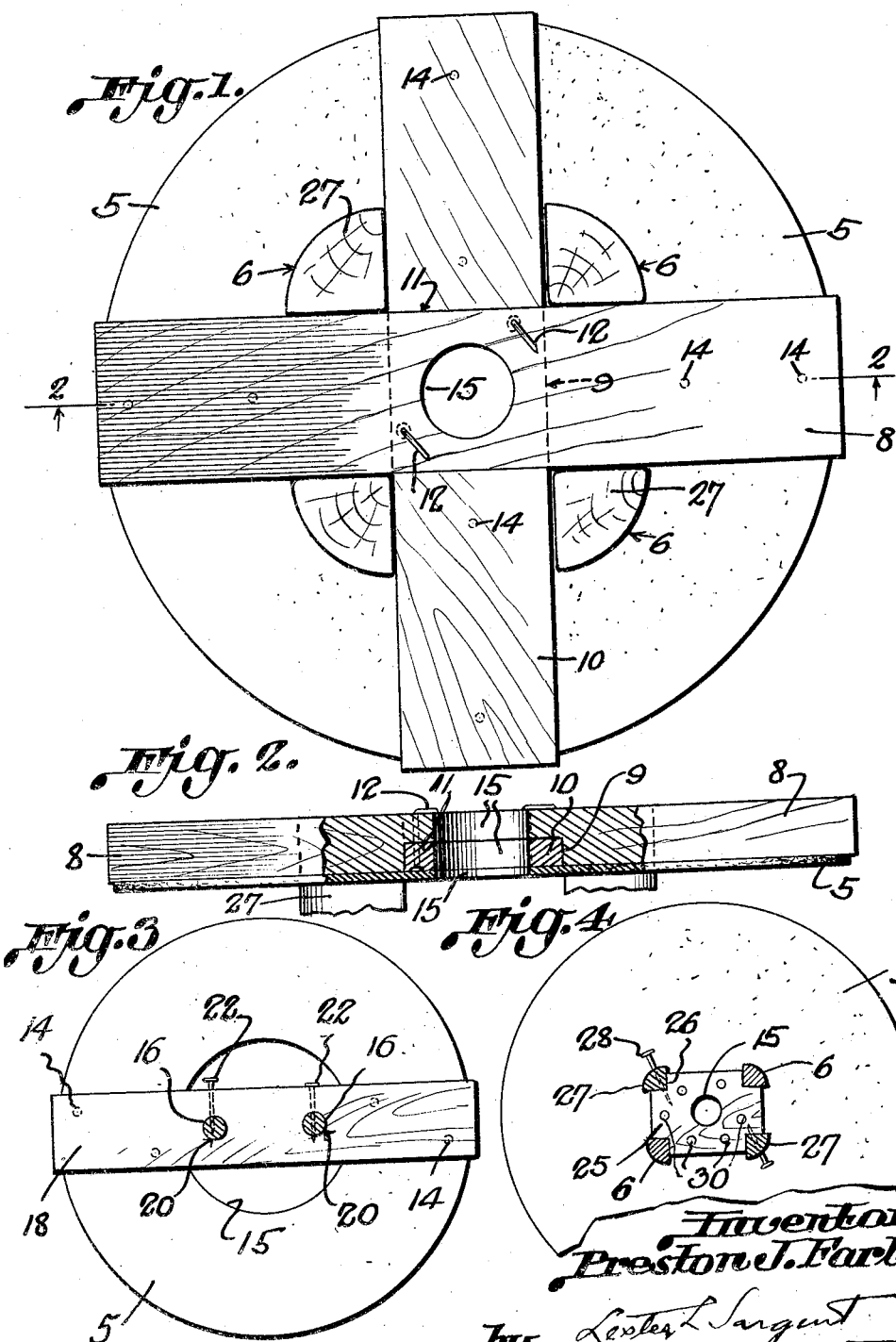

Patented Sept. 6, 1932

1,876,215

UNITED STATES PATENT OFFICE

PRESTON J. FARLEY, OF CALIFON, NEW JERSEY

SPOOL WITH REENFORCED HEAD

Application filed August 23, 1929. Serial No. 388,007.

My invention relates to a novel spool with reinforced head used as a shipping spool to carry solder, wire tape and leather belting and for like purposes and my object is to provide novel means for reinforcing the head and barrel of the spool and at the same time providing a spool which can be manufactured at relatively small expense.

I attain these and other objects of my invention by the devices illustrated in the accompanying drawings, in which,—

Figure 1 is an end elevation of my spool with the reinforcing rods 27 shown in section;

Fig. 2 is a view partly in edge elevation and partly in section, the portions shown in section being approximately on the line 2—2 of Fig. 1;

Fig. 3 is an end elevational view of a modified form of head; and

Fig. 4 is an end elevation of the inside of the head shown in Fig. 1, the view being reduced in size and partly broken away to occupy less space;

Fig. 5 is an end elevation showing a form of my invention in which only two slats 27 are used;

Fig. 6 is a section through the head of the spool on line 6—6 of Fig. 5, one of the slats 27, however, being shown in side elevation instead of in section;

Fig. 7 is a similar view of a modified form of the invention, having the opening 15 in block 25 and bar 18 (or bars 10 and 8) screw-threaded to engage the screw-threaded end 23 of barrel 7;

Fig. 8 is a similar section through the head of the spool showing a modified form in which a plug 13 is provided to engage in the hollow barrel 7, while its screw-threaded end engages in the screw-threaded opening 15 of block 25 and bar 18 (or bars 10 and 8);

Fig. 9 is a perspective view of a modification of the invention having a paper cylinder forming the barrel of the spool; and Fig. 10 is a section on line 10—10 of Fig. 9.

Like numerals designate like parts in Figs. 1, 2 and 4.

Referring to the accompanying drawings I provide a suitable disc 5 of cardboard, fiber, veneer or other suitable material which is reinforced by a pair of wooden arms 8 and 10 having suitably recessed portions 11 and 9 to fit snugly together and where they cross, the portions being suitably fastened to the disc 5 as by brads 14 and to each other by suitable brads or nails 12. I provide apertures 6 in disc 5 to receive rods or arms 27 which reinforce the entire spool and which may be affixed either to the wooden arms 8 and 10. I provide a reinforcing strip 25 on the inner side of the disc 5 to which the bars or rods 26 may be fastened, as by brads 28, the reinforcing strip in turn being fastened to the disc by suitable brads or nails 30. It is within the contemplation of my invention to use either two or four of the reinforcing rods or bars 27.

It is also within the contemplation of my invention to provide a modified form of spool head having a single bar 18 instead of the cross arms 8 and 10, this bar 18 having also the aperture 15 for the barrel is provided with suitable bars or rods 20 (having a function similar to the bars 27 of Figs. 1, 2 and 3) but mounted directly in apertures 16 in bar 18 and secured there by suitable brads 22.

It is also within the contemplation of my invention to provide either one or more of the wooden arms reinforcing the disc; and to provide either a fiber, veneer or disc of other suitable material reinforced substantially as described and shown and to substantially fasten the slats or rods either to the reinforcing wooden arms or bar or to the disc itself in any suitable manner.

I prefer to place wooden blocks, such as shown in Fig. 4, between the slats and nail slats to same for the purpose of reinforcing the slats. These blocks may be used with or without apertures for slats and in any number desired. They may be nailed, screwed or bolted to the head, as shown in Fig. 4. A paper cylinder or other suitable material (not shown) may be used to cover the slats forming the barrel, but in some cases no such cylinder will be necessary as the rods or slats 27 themselves form the barrel.

Referring to Fig. 5, there is illustrated a form of my invention in which only two of the slats 27 are used and secured to a single bar 18, as shown in Figs. 5 and 6.

Referring to Fig. 7 there is illustrated a modified form of my invention, in which the barrel 7 of the spool is provided with a screw-threaded end 23 to engage in the aperture 15, which in this instance is screw-threaded, for the purpose.

In Fig. 8 there is illustrated a further modification in which the hollow fiber barrel 7 is provided with a plug 13 which has its end 32 screw-threaded to engage in the aperture 15, which also in this instance is screw-threaded for the purpose, thereby providing a convenient means of attaching the barrel to the heads of the spools.

What I claim is:

1. In a spool for carrying heavy material, the combination of a pair of discs forming the heads of the spool, said discs having central apertures and having additional apertures for the insertion of reinforcing slats, one or more wooden bars mounted on the outer surface of the discs and reinforcing same, said wooden bars having apertures corresponding with the central aperture of the disc, blocks mounted on the inner surface of the discs, said blocks having apertures corresponding with the central aperture of the disc, slats extending from one disc to the other disc, said slats being affixed to the wooden reinforcing bars.

2. In a light spool for carrying heavy material, the combination of a pair of fibre discs, wooden arms arranged in the form of a cross and affixed to each of the discs, each of the discs having apertures adjacent the intersecting portions of the arms, and wooden bars mounted in the discs and adapted to carry a paper cylinder and to form the barrel of the spool.

3. In a light spool for carrying heavy material, the combination of spool heads each comprising a disc of light material such as fibre, one or more like wooden cross arms reinforcing the disc, a barrel of light material extending from one disc to the other, rods affixed to the wooden arms and extending from one disc to the other to reinforce the barrel and heads of the spool, the disc having apertures adjacent the reinforcing arms to receive said reinforcing rods.

4. In a spool for carrying heavy material, the combination of a pair of discs of light weight material such as fibre forming the heads of the spool, one or more like wooden arms reinforcing each of said discs, rods extending from one disc to the other and attached to said discs, the discs having apertures to receive said rods, means for fastening the rods to the wooden arms, and a barrel reinforced by said rods, said barrel being of light weight material such as paper.

5. In a spool for carrying heavy material, the combination of a pair of discs of light weight material such as fibre forming the heads of the spool, blocks fastened to the heads to reinforce same, slats fastened to the blocks and extending from one disc to the other, and one or more wooden arms reinforcing each of said discs.

6. In a spool for carrying heavy material, the combination of a pair of discs of light weight material forming the heads of the spool, blocks fastened to the heads to reinforce same, said blocks having recessed portions, slats mounted in the recessed portions of the aforesaid blocks and extending from one disc to the other to form the barrel of the spool, said slats being fastened to the blocks, and reinforcing rods on the discs which form the heads of the spools.

PRESTON J. FARLEY.